United States Patent Office 3,803,260
Patented Apr. 9, 1974

3,803,260
$H_2S$ MODIFIED DEHYDROGENATION OF LOWER ALKANES
David V. Porchey and Dennis J. Royer, Ponca City, Okla., assignors to Continental Oil Company, Ponca City, Okla.
No Drawing. Filed Dec. 20, 1971, Ser. No. 210,139
Int. Cl. C07c 3/28
U.S. Cl. 260—683.3                 6 Claims

ABSTRACT OF THE DISCLOSURE

In a process for dehydrogenation of an alkane having two to three carbon atoms per molecule to an alkene; the instant invention relates to an improvement comprising admixing about 0.10 to 30 parts by weight of $H_2S$ (or an amount of a compound which yields an SH radical in the dehydrogenation environment sufficient to yield that amount of $H_2S$) per 100 parts by weight of alkane, and then passing the resulting mixture plus 0.1 to 1 part of steam per part of resulting mixture to a reactor maintained at a temperature of 1300 to 1800° F., with a residence time of 0.1 to 10 seconds, with a total pressure of 0 to 150 p.s.i.g., and with a hydrocarbon partial pressure of 5 to 120 p.s.i.a.

BACKGROUND OF THE INVENTION

This invention relates to an improvement in the dehydrogenation of lower molecular weight alkanes.

Tremendous quantities of lower alkenes are used and needed by modern chemical process industries. Thus, huge quantities of propylene are polymerized to polypropylene, are employed to produce propylene oxide and other chemicals, and are employed for other uses.

A considerable need exists for improved methods of producing such lower alkenes which are used and needed in huge and ever increasing quantities. In addition, higher yields from the feedstocks are sought because of increasing feedstock prices. In particular, it is anticipated that the need for propylene will greatly increase in the near future.

One means for obtaining such lower alkenes is by dehydrogenating alkanes. Any improvement in such a dehydrogenation process whereby the yields of alkenes is improved or whereby the relative selectivity of propylene to ethylene in the dehydrogenation of propane is improved is of considerable benefit to industry, and constitutes a significant advance in the art.

OBJECTS OF THE INVENTION

One object of the invention is to provide an improvement in the process for conversion of propane to produce alkenes whereby the selectivity to propylene is increased.

Another object of this invention is to provide an improvement in the process for dehydrogenation of propane or ethane whereby the conversion to alkenes is improved.

These and other objects and advantages will appear from the following description of the embodiments of the invention, and the most novel features will be particularly pointed out hereinafter in connection with the appended claims.

SUMMARY OF THE INVENTION

In one aspect, this invention discloses an improvement in a process for dehydrogenating an alkane having 2 to 3 carbon atoms to an alkene wherein the improvement comprises admixing about 0.1 to 30 parts by weight of $H_2S$ (or an amount of a compound which yields SH radicals in the dehydrogenation environment sufficient to yield that amount of $H_2S$) per 100 parts by weight of the alkane to be cracked within a mixture consisting essentially of $H_2S$ (or a precursor thereof) and a lower alkane, and then passing the mixture plus 0.1 to 1 part of steam per part of mixture through a reactor maintained at a temperature of 1300 to 1800° F. with a residence time of 0.1 to 10 seconds, with a total pressure of 0 to 150 p.s.i.g., and with a hydrocarbon partial pressure of 5 to 120 p.s.i.a.

DESCRIPTION OF THE PREFERRED EMBODIMENTS

This invention is based upon the discovery that introduction of $H_2S$ into the reaction environment of an alkane dehydrogenation reaction in the quantities and under the conditions specified increases conversion and increases the selectivity to, and thereby the production of, propene in the case of dehydrogenation of propane and ethane in the dehydrogenation of ethane.

The lower alkanes which are dehydrogenated according to the improved process of this invention include ethane and propane. Mixtures of such alkanes can also be employed if desired.

Lower olefins which do not have a double bond which is two carbons removed from another carbon-to-carbon bond can be included with the lower alkane feedstock, if desired.

The lower alkane feedstock can also contain higher olefins. However, the lower alkane feedstock should consist essentially of one or more alkanes having two to three carbon atoms per molecule. Higher olefins (that is, those olefins having an olefinic double bond which is two chain carbon atoms removed from any other carbon-to-carbon bond) are known to be easily cracked under the reaction conditions of the instant invention (Frech, U.S. 3,480,687, col. 1, lines 44–51 and col. 3, lines 48–66). More than relatively minor amounts of such olefins are preferably avoided in the alkane feedstock for the instant dehydrogenation process because undesirable side reactions militating against the beneficial effect of the addition of $H_2S$ (or a precursor thereof) and undesirable coking in the reactor otherwise occur when the dehydrogenation conversion of the instant invention is carried out.

Although it is true that Frech (U.S. 3,480,687) teaches that lower alkanes such as ethane and propane can be employed as a diluent in quantities as great as 15 moles or more per mole of higher olefin to be cracked in the presence of $H_2S$, Frech also teaches that such lower alkanes are inert under his reaction conditions. The discovery upon which this invention is based is contrary to the teachings of Frech and is surprising in view of those teachings.

According to the process of the instant invention, the mixture consisting essentially of a lower alkane and $H_2S$ (or a precursor thereof) plus 0.1 to 1 part of steam per part of mixture is exposed to the dehydrogenation environment at a total pressure of 0 to 150 p.s.i.g. and a hydrocarbon partial pressure of 5 to 120 p.s.i.a. for a residence time of 0.1 to 10 seconds. These residence times and the relationship to the respective pressures are believed to be critical. If the residence time is too long, particularly at relatively low pressure, undesirable side reactions occur which militate against the beneficial effect of adding $H_2S$ (or a precursor thereof) to the alkane to be cracked. Residence time which is too short leads to low conversions which are not commercially desirable. It is presently most preferred to employ a residence time of 0.1 to 5.0 seconds and total pressure of 0 to 100 p.s.i.g.

Preferably, the dehydrogenation conversion is conducted continuously. When the dehydrogenation conversion is conducted continuously, a gas hourly space velocity of about 78 to 113,000 cc. of gaseous feed volume per cc. of reactor volume per hour at STP (standard temperature pressure) is preferably employed. At higher space velocities insufficient reaction occurs to be commercially desirable, and at lower space velocities an undue amount of deleterious side reactions occur.

The reaction environment is maintained at a temperature of 1300 to 1800° F. Below 1300° F., insufficient dehydrogenation occurs, and above 1800° F. undesirable side reactions occur: a presently preferred temperature range for commercial operation is 1460 to 1650° F..

It is often advantageous to employ the shorter residence times of the invention when the higher reaction temperatures are employed in order to avoid side reactions which militate against the beneficial effect of employing $H_2S$ (or a precursor thereof) in admixture with the lower alkane feed.

According to the improvement in the dehydrogenation of lower alkanes of this invention, often, about 0.1 to 30 parts by weight of $H_2S$ per 100 parts by weight of the total lower alkane of the feed passed to the dehydrogenation reactor are employed. Levels of $H_2S$ below about 0.1 part by weight are not effective, and levels above about 30 parts by weight are not economical. Often, the feed mixture consists essentially of ethane and $H_2S$, propane and $H_2S$, or mixtures of the lower alkanes, propane and ethane, and $H_2S$, or in lieu of all or part of the $H_2S$, an equivalent amount of a compound which yields $H_2S$ in the dehydrogenation environment.

More preferably, about 0.5 to 10 parts by weight of $H_2S$ (or an amount of a compound which yields $H_2S$ in the dehydrogenation environment sufficient to yield that amount of $H_2S$) per 100 parts by weight of the lower alkane to be dehydrogenated are employed. Such levels are most commercially feasible. Examples of materials which yield $H_2S$ in the cracking environment include: mercaptans, mercaptides, thioethers, carbon disulfide, ammonium sulfide, polysulfides, such as disulfide oils, sulfur, ammonium polysulfide, and the like. Essentially any substance which will yield $H_2S$ under the reaction conditions specified otherwise can be employed in lieu of any proportion of the $H_2S$ specified, which compounds will yield $H_2S$ under the dehydrogenation environment specified are well known to the art or can readily be determined by simple experiment not amounting to invention by one having ordinary skill in the art. Mixtures of $H_2S$ and an in situ $H_2S$ precursor can be employed if desired.

Steam in the range of 0.1 to 1 part by weight of per part by weight of mixture consisting essentially of lower alkane and $H_2S$ (or $H_2S$ precursor) is employed according to the process of this invention. This amount of steam is esential in order to minimize coking. The steam is also useful in reducing partial pressure of the hydrocarbons. In addition to the steam employed, gaseous diluents which are substantially entirely inert to the reaction environment such as nitrogen, helium, neon, methane, ethylene, and the like can be employed if desired to lower the partial pressure of the hydrocarbon. Generally, not more than 1 part of steam plus gaseous diluent per part of feed are suitable.

The $H_2S$ (or precursor thereof) can be admixed with the lower alkanes, steam, and with the other components of the feedstock, if any, by any means heretofore known to the art for admixing fluids. Often, a conventional proportionator is advantageously employed.

The improved dehydrogation process of the instant application can be conducted in a reaction chamber which is packed with a suitable particulate packing material which can be, but is not limited to, a heterogeneous catalytic material. Examples of suitable particulate packing materials include: alumina, kaolin, magnesium oxide, silicates, and the like. Suitable packing material for a packed bed often has the greatest dimension of particles in the range of 1/8 inch to 3/8 inch. Also, presently believed to be most suitable of the packing materials is a packing material comprising particulate alumina having a particle size of about 70 to 400 U.S. sieve which is employed as a fluidized bed.

The $H_2S$ (or precursor thereof) of the instant invention is believed to function as a reaction directing agent or homogeneous catalyst. Thus, the effect noted differs from mere metal or catalyst passivation as disclosed by Groll in U.S. 2,168,840. Groll does not obtain the beneficial results of the instant invention because his residence times are too long. Thus, in his Example 1 he employs a residence time of about 18 seconds. That an entirely different reaction environment is present according to Groll's process is evidenced by the fact that he makes large quantities of aromatics and other heavy products not produced by the dehydrogenation process of the instant invention. Furthermore, as is seen in Example 1 wherein propane is reacted, the propane was cracked to methane and ethylene rather than being dehydrogenated to propylene as is effected according to the process of the instant invention. Groll's system is essentially a heterogeneous system wherein reaction takes place with the gaseous molecules at the solid catalytic surface upon the wall of the catalyst tube or the solid catalyst surface. In contrast, the system of the instant invention is a homogeneous catalytic system wherein the reaction is effected upon contact of the gaseous $H_2S$ molecules plus generated radicals and the gaseous lower alkane molecules plus generated radicals. Thus, it appears clear that Groll never obtained or recognized the unexpected result of the instant invention, that is, the promotion of selectivity to production of propene in the dehydrogenation of propane, the promotion of selectivity to the production of ethene in the dehydrogenation of ethane, and the promotion of conversion which is obtained when $H_2S$ is admixed with a lower alkane which is then dehydrogenated within the critically defined parameters disclosed and claimed in the instant application. The side reactions occurring under the conditions Groll employed (which are outside the critical ranges of pressure and residence time of the instant invention) militated against the selectivity promoting and conversion promoting effects of $H_2S$ in Groll's system.

EXAMPLES

Example 1

Propane was dehydrogenated in a tube-type reactor fabricated of stainless steel and having an internal diameter of about 1.049 inches and a length of two feet at 0 p.s.i.g. with the reactor being packed with about 250 grams of "Catapal N" alumina [1] having a cylindrical tablet size of 0.125 inch by 0.125 inch with reaction parameters and results as are shown in the following Table 1.

TABLE 1

|  | Run 1 | Control, Run 2 |
|---|---|---|
| Propane feed rate, lb./hr | 0.390 | 0.390 |
| Hydrogen sulfide rate, l./min | 0.033 | 0.0 |
| Water rate ml./min | 1.0 | 1.0 |
| Hot spot temp., °F | 1,400 | 1,400 |
| Approx. residence time, sec.[1] | 0.76 | 0.77 |
| Conversion, percent [2] | 21 | 16 |
| Olefin selectivities, w/o:[3] |  |  |
| Ethylene | 32.1 | 34.1 |
| Propylene | 40.9 | 38.0 |
| n-Butenes | 5.9 | 2.5 |
| Propylene/ethylene, lb./lb | 1.27 | 1.11 |

[1] Residence time was calculated by employing the full reactor volume.
[2] Conversion is defined as: Gms. alkane converted to any product/Gms. alkane charged (100).
[3] Selectivity is: gms. alkene produced/gms. alkane converted to any product (100).

These data clearly demonstrate that addition of $H_2S$ to the reaction environment wherein propane is dehydro- ---
[1] "Catapal N" alumina is a trademarked high purity alumina which is an alpha-aluminum monohydrate having a surface area of bout 180 sq. meters/gm. and a cumulative pore volume of up to 10.000 A. of 0.48 cc./gm. which is produced by water hydrolysis of an aluminum alkoxide. It is commercially available from Continental Oil Company, Teterboro, N.J.

genated results in an increase in the propene to ethene ratio of about 20 percent. Conversion is also clearly demonstrated to be substantially increased.

Example 2

Runs were made wherein ethane was dehydrogenated. A tube-type reactor which was fabricated of stainless steel and which had an internal diameter of 0.5 inch and a length of 3 feet was employed. Reaction parameters were employed and results were obtained as listed in the following Table 2.

TABLE 2

| | Run 3 | Run 4 | Control Run 5 | Control Run 6 |
|---|---|---|---|---|
| Hydrocarbon | Ethane | Ethane | Ethane | Ethane |
| Hydrocarbon feed rate, g./hr | 326 | 326 | 326 | 326 |
| Pressure, p.s.i.g | 15 | 15 | 15 | 15 |
| Steam feed rate, g./hr | 95.9 | 95.9 | 137 | 137 |
| Weight percent $H_2S$ of feed [4] | 6.3 | 6.3 | 0 | 0 |
| $(NH_4)_2S$ feed rate, g./hr | 41.1 | 41.1 | 0 | 0 |
| Residence time, seconds [5] | 0.53 | 0.53 | 0.53 | 0.53 |
| Hot spot temperature, °F | 1607 | 1607 | 1607 | 1607 |
| Conversion, wt. percent [2] | 75.2 | 75.7 | 71.0 | 73.1 |
| Ethene selectivity, wt. percent [3] | 75.3 | 76.8 | 74.5 | 72.8 |

See Table 1 for footnotes 2, 3.
[4] Calculated from the percent of the feed which was $H_2S$ in the reaction environment formed in situ from the $(NH_4)_2S$ charged.
[5] Residence time was calculated at operating conditions from a reactor temperarure profile, i.e., the time that the reactants are under cracking conditions is calculated.

These data demonstrate the $H_2S$ produced in situ by charging a feed consisting essentially of ethane and $(NH_4)_2S$ to a dehydrogenation environment is effective to improve conversion to ethene and selectivity for ethene. Ethylene (ethene) yield is increased about 2.4 weight percent and ethene conversion is increased about 4 weight percent.

Example 3

Runs were made wherein propane was dehydrogenated. A tube-type reactor which was fabricated of stainless steel and which had an internal diameter of 0.5 inch and a length of three feet was employed. Reaction parameters were employed and results were obtained as listed in the following Table 3.

TABLE 3

| | Run 7 | Control Run 8 | Run 9 | Control Run 10 | Run 11 | Control Run 12 |
|---|---|---|---|---|---|---|
| Hydrocarbon | Propane | Propane | Propane | Propane | Propane | Propane |
| Hydrocarbon feed rate, g./hr | 386 | 386 | 386 | 386 | 386 | 386 |
| Pressure, p.s.i.g | 15 | 15 | 15 | 15 | 15 | 15 |
| Steam feed rate, g./hr | 158.5 | 173.5 | 158.5 | 173.5 | 158.5 | 173.5 |
| Weight percent $H_2S$ of feed [4] | 3.26 | 0 | 3.26 | 0 | 3.26 | 0 |
| $(NH_4)_2S$ feed rate, g./hr | 15 | 0 | 15 | 0 | 15 | 0 |
| Residence time, seconds [5] | 0.55 | 0.61 | 0.54 | 0.60 | 0.53 | 0.58 |
| Hot spot temp., °F | 1,544 | 1,544 | 1,580 | 1,577 | 1,634 | 1,637 |
| Conversion, wt. percent [2] | 76.2 | 70.5 | 88.0 | 87.6 | 97.4 | 93.8 |
| Ethene selectivity, wt. percent [3] | 32.3 | 35.6 | 34.6 | 39.1 | 35.4 | 39.3 |
| Propene selectivity, wt. percent [3] | 30.9 | 23.2 | 23.6 | 14.5 | 12.1 | 9.4 |
| Total alkene selectivity, wt. percent [3] | 63.2 | 58.8 | 58.2 | 53.6 | 47.5 | 48.7 |
| Propene/ethene ratio | 0.95 | 0.65 | 0.63 | 0.37 | 0.34 | 0.24 |

This example demonstrates that use of $H_2S$ increases propane conversion, propane yields, and propene/ethene ratio compared to thermal dehydrogenation.

Example 4

A series of runs are made wherein propane in the absence of $H_2S$ is dehydrogenated in a reactor similar to that of Example 3 for a period of time. Then, $H_2S$ is employed concurrently with the propane for a period of time. Then, only propane without $H_2S$ cofeed is employed for a period of time. Under the reaction parameters listed in Table 3, results similar to the results reported in control runs 8, 10, and 12 are effected under similar conditions before the $H_2S$ is employed concurrently with the propane. When the $H_2S$ is employed concurrently with the propane, results similar to those of inventive runs 7, 9, and 11, respectively. However, when the $H_2S$ is no longer charged concurrently with the propane, the results revert to a state as they were before charging $H_2S$ concurrently with the propane.

The runs of this example demonstrate that conversion and selectivity to propene rapidly fall back to the level which was prevalent before $H_2S$ was added to the feedstream when ageing effects on the catalyst are taken into account. Thus, the effect produced by addition of the $H_2S$ is that of a homogeneously catalyzed system wherein $H_2S$ is the catalyst and not a mere passivation of catalytic surfaces present on the reactor walls. According to this invention, $H_2S$ must be concurrently introduced into the reaction environment with the lower alkane feedstock. The need for concurrent introduction of the lower alkane and the $H_2S$ is demonstrated by this example. Mere treatment of the reactor walls with $H_2S$ to passivate them is demonstrated to be ineffective.

Example 5

A series of runs is effected wherein a quartz reactor tube without any packing is employed to dehydrogenate an ethane and a propane feedstock. Addition of 0.1 to 30 weight percent $H_2S$ based on the alkane increases the amount of dehydrogenation.

These runs demonstrate that $H_2S$ is acting as a homogeneous catalyst rather than passivating any catalyst or reactor surface or sulfiding any metal present in the reaction environment.

Example 6

In lieu of $(NH_4)_2S$ other $H_2S$ precursors are employed in runs which otherwise repeat the runs of Example 3. Other $H_2S$ precursors employed include the following: methanethiol, dodecanethiol, ethyl sulfide, dodecyl sulfide, sulfur, carbon disulfide, and 1,4-cyclohexanedithiol. Results similar to those of Example 3 are obtained.

This example demonstrates that a wide variety of $H_2S$ precursors are suitable for use according to this invention as promoters for the dehydrogenation of ethane or propane.

We claim:
1. In a process for dehydrogenating a lower alkane having 2 to 3 carbon atoms per molecule to an alkene; the improvement comprising admixing about 0.5 to 10 parts by weight of $H_2S$ (or an amount of a compound which yields an SH radical in the cracking environment sufficient to yield that amount of $H_2S$) per 100 parts by weight of lower alkane in the mixture consisting essentially of $H_2S$ (or the precursor thereof) and the lower alkane to be dehydrogenated, and then passing the resulting mixture plus 0.1 to 1 part by weight of steam per part by weight of the mixture to a reactor maintained at a temperature of 1460 to 1650° F. with a residence time of 0.1 to 5.0 seconds, with a total pressure of 0 to 100 p.s.i.g., and with a hydrocarbon partial pressure of 5 to 120 p.s.i.a.

2. The improved process of claim 1 wherein the lower alkane is ethane.

3. The improved process of claim 1 wherein the lower alkane is propane.

4. The improved process of claim 1 wherein the dehydrogenation reaction is carried out continuously and wherein the conversion is carried out at a gas hourly space velocity of about 78 to 113,000 cc. of gaseous feed volume per cc. of reactor volume per hour at standard temperature and pressure.

5. The improved process of claim 4 wherein the alkane to be dehydrogenated is propane.

6. The improved process of claim 4 wherein the alkane to be dehydrogenated is ethane.

References Cited

UNITED STATES PATENTS

| | | | |
|---|---|---|---|
| 2,621,216 | 12/1952 | White | 260—683.3 |
| 2,772,315 | 11/1956 | Hadden | 260—683.3 |
| 2,415,477 | 2/1942 | Folkins | 260—683 |
| 3,387,054 | 6/1968 | Schuman | 260—683.3 |

FOREIGN PATENTS

| | | | |
|---|---|---|---|
| 1,487,433 | 7/1967 | France | 260—683.3 |

DELBERT E. GANTZ, Primary Examiner

J. M. NELSON, Assistant Examiner